(12) United States Patent
Carle et al.

(10) Patent No.: US 7,479,876 B2
(45) Date of Patent: Jan. 20, 2009

(54) WIRELESS INTEGRATED CONDITION MONITORING SYSTEM

(75) Inventors: Patrick F. Carle, Austin, TX (US); David J. Bibelhausen, Mainville, OH (US); Frederick Michael Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 179 days.

(21) Appl. No.: 11/346,472

(22) Filed: Feb. 2, 2006

(65) Prior Publication Data

US 2006/0238332 A1 Oct. 26, 2006

Related U.S. Application Data

(60) Provisional application No. 60/649,772, filed on Feb. 2, 2005.

(51) Int. Cl.
*G08B 1/08* (2006.01)
(52) U.S. Cl. ............... 340/539.17; 340/3.1; 340/539.24; 340/540; 340/669; 340/679; 73/570; 73/649; 318/490
(58) Field of Classification Search ............ 340/539.17, 340/635, 648, 679, 683, 670, 669, 3.1, 539.24, 340/540; 73/593, 649, 570, 660; 700/27, 700/108; 318/490; 702/33, 35, 56, 189
See application file for complete search history.

(56) References Cited

U.S. PATENT DOCUMENTS

| | | | | |
|---|---|---|---|---|
| 5,943,634 A * | 8/1999 | Piety et al. | .................. | 702/56 |
| 5,965,819 A * | 10/1999 | Piety et al. | .................. | 73/660 |
| 6,208,944 B1 * | 3/2001 | Franke et al. | ................ | 702/56 |
| 6,225,893 B1 * | 5/2001 | Caissie | ...................... | 340/438 |
| 6,297,742 B1 * | 10/2001 | Canada et al. | ............. | 340/635 |
| 6,301,514 B1 * | 10/2001 | Canada et al. | ............. | 700/108 |
| 6,839,597 B2 * | 1/2005 | Hattori et al. | ............... | 700/27 |
| 6,874,364 B1 * | 4/2005 | Campbell et al. | ........... | 73/593 |
| 7,097,351 B2 * | 8/2006 | Lancon et al. | ............... | 374/4 |
| 2003/0171827 A1 | 9/2003 | Keyes et al. | | |

* cited by examiner

*Primary Examiner*—Davetta W Goins
(74) *Attorney, Agent, or Firm*—Fletcher Yoder; R. Scott Speroff

(57) ABSTRACT

A wireless dynamic operating condition system is described that includes one or more wireless monitors located at a monitoring point in an instrumented machine system. The wireless monitors may be configured as a modular base with modular power supplies that can be attached to the base. The base may include integrated sensors or additional sensors may be tethered to the base. The resulting modular system allows for points to be monitored on the machine system for dynamic operating conditions that are difficult to access or are less critical than wired monitoring points. Calculations may be carried out based upon the sensed data either within the monitoring modules themselves or within specific modules that are so equipped.

22 Claims, 5 Drawing Sheets

WIRELESS INTEGRATED CONDITION MONITORING SYSTEM

CROSS REFERENCE TO RELATED APPLICATIONS

This application is a Non-Provisional of U.S. Provisional Patent Application No. 60/649,772, entitled "Wireless Integrated Condition Monitoring System", filed Feb. 2, 2005, which is herein incorporated by reference.

BACKGROUND

The present invention relates generally to the field of condition monitoring systems and methods. More specifically, the invention relates to techniques for wirelessly transmitting data pertinent to monitored machine systems, particularly dynamic parameters of monitored systems, as well as the techniques for packaging such wireless condition monitoring systems, configuring such systems, integrating such systems into networks, and so forth.

A wide range of applications exist for monitoring dynamic conditions of machine systems. Such systems often include rotating machinery, the operating state of which may change over various periods of time. For example, in large rotating equipment, motors, bearings, pumps, turbines and other components may undergo wear or other degradation that should be monitored to alert service personnel of the need to service the equipment or even replace the equipment in case of imminent failure. A range of techniques have been developed in a field generally referred to as integrated condition monitoring (ICM).

ICM systems presently deployed on a range of applications typically make use of wired connections between sensors and monitoring modules. The systems may also rely upon wired connections between various modules, and between the modules and a central or remote monitoring station. The overall ICM system may, then, permit detection of parameters at various locations in the monitored machine, as well as tracking of changes, setting of alarms, and even supporting control functions based upon the monitored dynamic conditions. Of particular interest in such systems are often vibration, temperature, and speed, as well as a range of process parameters.

Limited use has been made in practical applications of wireless ICM techniques. While certain wireless techniques have been proposed over the past two decades, they presently find little or no practical success due, in large part, to their complexity and cost. In current systems, more critical monitored points on a machine system will typically be instrumented for dynamic condition monitoring, while other points, deemed less critical in nature, will simply go unmonitored. In certain implementations, specially trained personnel may perform "walk arounds" in which mobile monitoring equipment is temporarily installed at less critical monitoring points to periodically check their operational state.

Many such monitoring points could be more adequately served through the use of wireless detection and networking. However, approaches that have been proposed in the past and that are currently available do not satisfy the need. Whereas wireless monitoring reduces the need for running and maintaining wired connections, existing wireless solutions are both expensive to purchase and install, and are complex in their configuration and programming. No solution currently satisfies the need for lower cost, on a monitoring point basis, and reduced complexity for installation, configuration, reconfiguration, operation, and so forth.

There is a need, therefore, in the field for improved techniques for wireless ICM systems.

BRIEF DESCRIPTION

The present invention provides ICM systems and methods designed to respond to respond to such needs. The systems may take a number of forms, but are based upon dynamic condition sensors that are associated at machine monitoring points and ultimately configured to transmit monitored data or data derived from monitored data wirelessly. The sensors themselves may be wireless, or the sensors may be wired to a wireless monitoring device, with a predetermined number of channels or inputs being coupled or couplable to the monitoring device. The monitoring device may use a conventional power source, a battery power source, power from the application, or scavenged power for its operation. The monitoring device may also perform certain data manipulations, such as filtering, amplification, or even calculations, such as Fourier transforms of vibration data, and so forth. The monitoring devices may also implement algorithms to generate alarms or other notifications, and may transmit these alarms, or other data, including the entire dataset either raw or processed (e.g., waveforms or vibration profiles). The technique is particularly well-suited to vibration monitoring. In such applications, the wireless monitoring device may monitor such parameters as vibration and temperature. Where desired, other parameters may also be monitored, such as speed or any process input.

The monitoring devices may be adapted for simplified or automatic configuration, greatly facilitating their installation and start-up. For example, the monitoring devices may be preprogrammed to transmit certain data and in certain modes and at certain time intervals. In one implementation, for example, the modes may include a continuous mode, a demand mode, and an event mode. The devices may switch between the modes as commanded by a master or a user, or upon occurrence of certain events, such as a parameter falling outside a permitted threshold or range. The initial configuration may be altered by a user. However, for many applications, the standard configuration may be suitable and installation thus greatly simplified by the pre-configuration.

The wireless devices may also be configured to operate on various data receipt and transmission schemes. For example, specific coordinated windows for receiving and transmitting data may be programmed into the devices. Clocks for synchronizing such windows may be implemented and known times transmitted between the monitoring devices to maintain the synchronicity.

In certain implementations, calculations may be made at points exterior to the wireless devices. The wireless devices may, then, act essentially as wireless input/output or I/O points collecting data from the sensors and transmitting it for processing. In other implementations, calculations may be made by one or more of the monitoring devices based upon data collected and/or processed by other monitoring devices. Thus, performance analysis that is impossible based upon the data known to one monitoring device may be determined by another device based upon data from both devices, again transferred wirelessly between the monitoring points.

The monitoring devices may be designed for mounting directly at a monitoring point, such as on a machine, with imbedded sensors or tethered sensors extending from the monitoring device to points on the machine to be monitored. The device may be completely modular in nature, allowing for utilization of optional add-ons, such as various power sources. Such power sources might include modular versions of battery power sources, scavenging sources, photovoltaic sources, wired sources, and so forth. The overall configuration and operation of the modular units may be designed and adapted to provide the desired level of monitoring and feedback (e.g., complete waveforms or alarms only) with energy efficiency as a key goal (i.e., minimal energy utilization).

Particular algorithms may also be implemented in the devices or in remote software that operates on data collected in the wireless devices. For example, to greatly facilitate configuration of the devices, an algorithm may permit identification of the type of machine, bearing, or other component at the monitoring point. Based upon such automatic identification, then, the configuration of the monitoring device may be made, or the initial configuration may be altered, such as to set known alarm limits based upon the identification of the component.

DRAWINGS

These and other features, aspects, and advantages of the present invention will become better understood the drawings, wherein various configurations and features of the invention are set forth textually and graphically.

DETAILED DESCRIPTION

Figure 1:
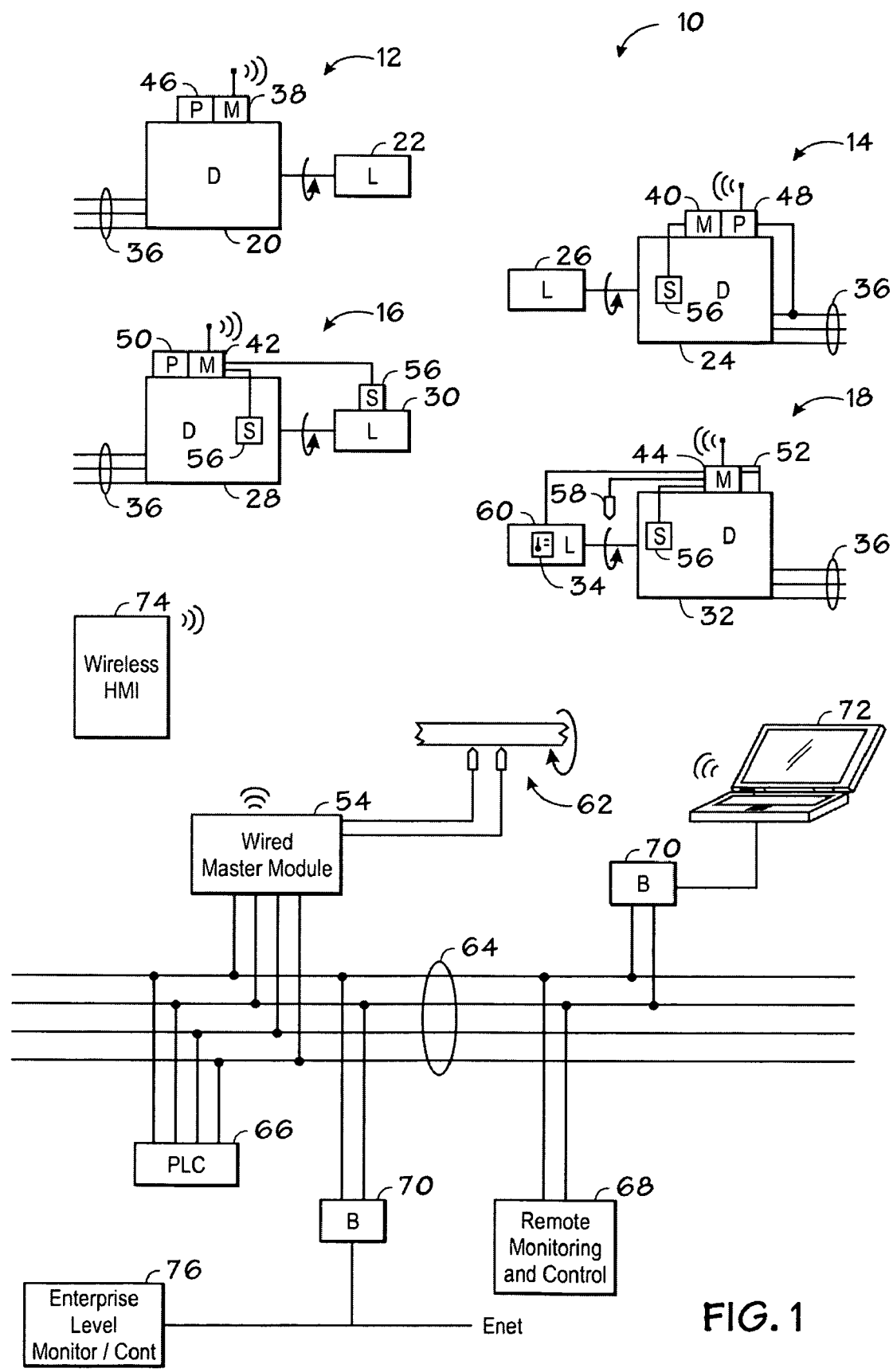
FIG. 1 is a diagrammatical representation of an instrumented machine system including wireless sensors and sensing technologies in accordance with the present invention.

Turning now to the drawings, and referring first to FIG. 1, the present invention is particularly well-suited for use in an instrumented machine system as designated generally by the reference numeral 10. The instrumented machine system may include any suitable machine system, such as those used in factory automation, manufacturing, material handling, and so forth. However, such systems may also include power generation and distribution systems, oil, gas, plastics and other process industries, and so forth. In general, the machine system may include a plurality of monitoring points at which operational parameters, particularly dynamic operating parameters are measured and noted. As used herein, the term "dynamic operating condition," or the reference to dynamic conditions in general, is intended to convey physical conditions or parameters of a machine system, as opposed, for example, to electrical conditions. The dynamic conditions may include such characteristics as vibration, rotation, speed, temperature, pressure, and so forth.

The wireless nature of the modular system described below enables such points to be monitored through individual modular monitoring devices that are separated by greater or smaller distances from one another, but that are not interconnected through wiring. As noted below, certain wiring can be used between sensors and even between monitoring points. However, more generally, two or more of the monitors are not wired together, but communicate at least sensed data wirelessly.

The wireless communications described herein may be made in accordance with any suitable wireless technique. For example, present wireless standards that satisfy the needs of the system might include ZIGBE, IEEE 802.11, Bluetooth, and so forth. Other technologies that are presently suitable, or that may soon be suitable include cellular telephony techniques. For distant communications, the techniques may include point hopping technologies, in which monitoring modules are scheduled to sleep and awaken to send and receive signals on a predetermined basis. Such techniques will allow for wireless communications at greater distances, and will also reduce the power required for driving the monitoring equipment and sensors.

In the diagrammatical illustration of FIG. 1, four specific monitoring points are illustrated and designated generally by reference numerals 12, 14, 16 and 18. These monitoring points may, in practice, be separated yet physically monitor different locations in a single machine or assembly. However, the monitoring points may be quite the distance from one another, such as in the case of motors in a conveyor system, monitored bearings in a turbine system, motors and bearings in a process control or material handling system, and so forth. As represented in FIG. 1, each of the monitoring points includes some sort of drive and an associated load. It should be noted, however, that dynamic monitoring of data need not necessarily be performed on a drive device, such as an electric motor or a load, but may be done on a rotating shaft, a bearing, or any other mechanical system component. The drives and loads shown in FIG. 1 are, therefore, provided for the present exemplary presentation only. The drives 20, 24, 28 and 32 of the respective monitoring points are assumed, in the present example, to drive their respective loads 22, 26, 30 and 34 in rotation. Such arrangements may be typical, for example, pump and motor combinations, motor and pulley arrangements, and so forth. In the illustrated embodiment, each of the drives receives power from a power supply, such as three-phase power from the power grid, as indicated by reference numeral 36.

Each of the monitoring points 12, 14, 16 and 18 is equipped with a respective wireless monitor as indicated at reference numerals 38, 40, 42 and 44. As discussed in greater detail below, each of these wireless monitors is capable of detecting dynamic operating conditions at a monitoring point, at least partially processing data representative of the operating conditions, storing the data, and transmitting the data to one or more of the other wireless monitors, or to a transmitting and receiving station where the data is collected. In a presently contemplated embodiment, for example, the wireless monitors may provide data to one another, or to particular master monitors. The data may be processed fully at each of the monitoring points, or certain of the wireless monitors may be equipped with enhanced processing capabilities to identify and process the monitored data of particular interest. In still other arrangements, the detailed processing of the monitored data may take place at remote monitoring and control locations described in greater detail below. In any particular system, some or all of these techniques may be employed, with virtually raw data being collected and transmitted by certain simplified wireless monitors, processed or partially processed data being collected and transmitted by other monitors, and complex computations being performed either at certain enhanced wireless monitors or remotely.

The wireless monitors may include one or more channels for monitoring different parameters of interest. In a presently contemplated embodiment, for example, the monitors may include one or more accelerometers (e.g., for monitoring vibration or a vibration-related parameter), thermocouples for measuring temperature, tachometers for measuring speed, as well as a wide variety of other condition monitors. The monitors may also include simple by-stable switches, such as for measuring presence or proximity of objects. Where complex parameters such as vibration are monitored, the monitors may process the data, such as through a Fast Fourier Transform to generate a vibration profile of particular interest. As noted below, where certain monitors are incapable (i.e., not provided the processing capabilities) of performing such complex calculations, they may transmit raw or semi-processed data to other monitors where the calculations may be performed. Similarly, certain parameters may not be apparent from monitoring at a single point. Such parameters may require combination or comparison of monitored data taken at multiple points (i.e., torque or cyclic vibration in a shaft). In such cases, certain of the monitors may be equipped for transmitting data to other monitors where the data is combined for performing the multi-point computations.

By way of example, the sensors may detect dynamic operating conditions such as valve position and case expansion in turbine and other rotating systems, eccentricity, bearing absolute casing vibration, both in X and Y directions, differential expansion, speed of rotation, rotational phase, and so forth. As will be noted by those skilled in the art, various sensors and transducers may be employed for these purposes, including linear variable differential transformers, non-contact pickups, rotary potentiometers, accelerometers, and so forth. Indeed, in a present implementation, the particular configuration of monitors within the monitoring assemblies includes a specially adapted vibration monitor designed to be coupled to a tachometer and to an accelerometer. Such accelerometers may detect, for example, signals indicative of shaft, casing or pedestal vibration, depending upon the application.

As also noted below, the monitors may be provided with various types of logic for alerting operations personnel of certain conditions arising in the machine system. For example, alerts may be programmed into some or all of the monitors for normal and unwanted conditions. These alert levels or alarms may include, for example, excessive vibration levels at particular frequencies, temperatures, speeds, or a combination of operating parameter alert levels. The individual monitors may convey such alerts or alarms to one another or a remote location when a comparison performed within the wireless monitor indicates that an alert or alarm level is being approached or has been exceeded.

As also noted below, the present technique may be employed with various power saving approaches that may include operational control of the collection of data, the processing of data, and the transmission and receipt of data. For example, the wireless monitors may be adapted to operate in various modes, so as to collect, process and transmit data continually, intermittently, on demand, or when certain events, such as alarms or alert levels are detected. Similarly, the transmission may be coordinated in a synchronized fashion so as to provide data in a "hopping" scheme wherein power is saved by only transmitting and receiving data within certain windows of time, with a sleep mode provided therebetween.

To accommodate powering of the collection, processing, transmission and receipt of data, each wireless monitor is equipped with a power supply. Several modular-type of power supplies may be offered in the modular system, and associated with the individual wireless monitors depending upon the power available at the individual monitoring point.

As diagrammatically illustrated in FIG. 1, wireless monitor 38 is provided with a battery power supply 46, while other monitors, such as monitor 40 may be provided with a converter power supply 48. The converter power supply may extract power from the power provided to the machine system, such as from one of the conductors of the three-phase power applied to drive 24. The converter driver supply then converts the incoming power to the appropriate power required by the monitor, such as low voltage direct current power. Still other power supplies may include a power scavenging module 50 illustrated as associated with wireless monitor 42. The scavenging power supply may develop the power required for operation of the wireless monitor from environmental sources, such as vibration of the drive 28. Still other presently contemplated power supplies may include a photovoltaic power supply 52 which converts received light energy to power required for the wireless monitor associated therewith.

Various wireless monitors illustrated in FIG. 1 may, as noted above, communicate with one another, as well as with a wired master module, or with other components. Such exchange of data is performed wirelessly. At the same time, each wireless monitor may communicate with sensors which may be wired or tethered to the individual monitor. While certain monitors may thus stand alone, including their own integrated sensors, as illustrated for monitor 38 in FIG. 1, other monitors may be tethered to sensors such as illustrated at reference numeral 56 for monitors 40, 42 and 44. A particular operating parameter of interest for such monitoring is vibration, and the sensors illustrated by reference numeral 56 are sensors that include accelerometer assemblies for detecting mechanical movement or vibration. Other channels of the wireless monitors may be provided for wired or tethered connection to other types of sensors. For example, as illustrated in FIG. 1, the wireless monitor 44 is coupled to a speed sensor 58 and to a temperature sensor 60. As illustrated diagrammatically in FIG. 1, the operating parameters detected by the integrated or tethered sensors may be of the mechanical component on which the wireless monitor itself is mounted, as well as of other locations on the same mechanical component or even of different mechanical components within the vicinity of the wireless monitor.

Any wired master modules 54 provided in the system may themselves be coupled to local monitoring points as illustrated by reference numeral 62. Such condition monitoring modules operating on a wireless basis may conform generally to the descriptions contained in U.S. patent application Ser. No. 11/146,853, entitled "Wireless Modular Monitoring and Protection System Topology", filed on Jun. 7, 2006, and co-assigned with the present application, which reference is hereby incorporated by reference in its entirety. In general, the wired master module 54 illustrated in FIG. 1, while being capable of transmitting and receiving data wirelessly between itself and the wireless monitors, is physically coupled to a media cable 64 for providing network power and data signals. In accordance with aspects of the present technique, the network communicates via an open industrial data exchange protocol. As used herein, the term "open industrial data exchange protocol" generally refers to a non-proprietary and non-fee based scheme for formatting and transmitting data traffic between independent devices. A variety of such protocols have been developed and are presently available, including protocols designated generally in the industrial field as DeviceNet, ControlNet, Profibus and Modbus. Certain of such protocols may be administered by industry associations or bodies to ensure their open nature and to facilitate compliance with the protocol standards, such as the Open DeviceNet Vendors Association. It has been found that the use of a standard open industrial data exchange protocol for some or all of the communications between the modules, between assemblies, and between remote devices and the modules and assemblies, greatly enhances the interchangeability and applicability of the present system in various settings. Other data communication protocols may, of course, be used for the data exchange. The network permits a wide array of other devices to receive data initiating from the wireless monitors, and to provide data, instructions, programming and so forth to the wireless monitors. For example, the system illustrated in FIG. 1 couples a programmable logic controller 66 to the network for providing monitoring and control instructions, and for receiving monitored data used to execute routines for control purposes.

Other devices may also be linked to the instrumented machine system 10 so as to use the data monitored by the wireless monitors. For example, as illustrated in FIG. 1, various remote monitoring and control equipment, designated generally by reference numeral 68 may be provided. Such remote monitoring and control equipment may either be local to the instrumented machine system, or may be entirely remote from the system. For example, such control equipment may include communications via a local area network, a wide area network, including the Internet for remotely accessing data from the machine system and making decisions based upon the data. Thus, the remote monitoring and control equipment 68 may include monitoring stations centralized for an organization or enterprise entirely distant from the monitored machine system or installation. Similarly, bridge circuits 70 may be provided for converting data from the protocol used on the network to protocols used on different types of networks, such as an Ethernet network illustrated in FIG. 1. Such bridges also may provide for interfacing service workstations as indicated at reference numeral 72 which may upload data, download data, transmit identification, configuration, protocols and so forth to the various wireless monitors. Similarly, it is presently contemplated that the wireless monitors may convey information and receive information from various wireless human machine interface devices 74. These devices may be hand-held and may serve to gather information as operations personnel move between or among the various monitoring points. Finally, as indicated generally at reference numeral 76, enterprise level monitoring and control functions maybe implemented based upon data collected by the wireless monitors. Such enterprise level monitoring and control may be fully integrated with manufacturing, supply chain, maintenance and other enterprise-level functions to control the overall machine system, again based upon data collected from the wireless monitors.

As will be appreciated by those skilled in the art, wired and limited-used wireless monitoring has typically been limited to applications on particularly important monitoring points. That is, due to the cost of wiring such modules, only more critical monitoring points have typically been instrumented heretofore known systems. The wireless monitoring approach illustrated in FIG. 1 and described below is believed to provide a workable alternative in which even less critical monitoring points may be instrumented. That is, stand-alone or tethered sensors and wireless monitors may be installed at such points with little or no cost incurred for separate wiring. Because the monitors themselves and their power supplies are completely independent of machine, factory or site wiring, the cost of installation of such wireless monitors is greatly reduced. At the same time, information from the wireless monitors can be integrated with information from conventional wired or partially wireless systems for enhanced monitoring, analysis and control functions in an overall system.

Figure 2:
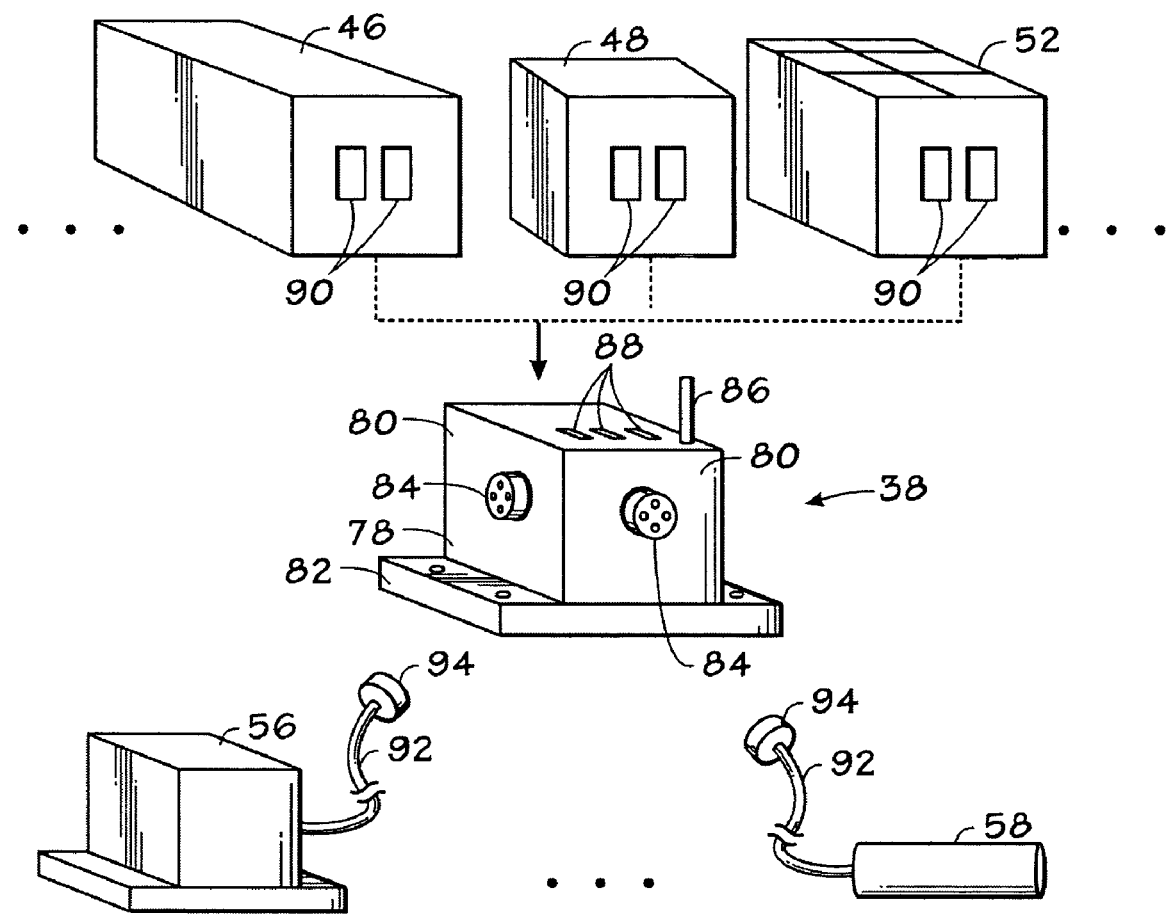
FIG. 2 is an exemplary modular arrangement for a wireless monitor base module with power options, tethered sensors, and so forth in an exemplary implementation for a system of the type shown in FIG. 1.

Packaging of the modular wireless monitors may follow any suitable scheme, with an exemplary scheme illustrated generally in FIG. 2. In a presently contemplated embodiment, the wireless monitor itself includes a base module to which other ancillary modules may be attached. The resulting system provides a high degree of flexibility and adaptability to the particular installation or even to the particular point to be monitored. In the illustrated embodiment, a base module 78 is designed with multiple faces 80 that may accommodate the additional modules. In the illustrated embodiment a mounting flange 82 is provided for securement of the base module to a monitoring point or other machine location. Other mounting systems may, of course, may be envisaged. Pin connectors 84 are provided at one or more of the faces of the base module for receiving and exchanging information with tethered sensors. An antenna 86 is provided that may be either partially external as illustrated in FIG. 2, or completely internal within the base module. In the illustrated embodiment, the base module also provides multiple visual indicators, such as LEDs 88 that may be colored or otherwise configured to provide ready indications of its operating state, or even the state of one or more parameters. That is, a green LED may for example indicate the good operating state of the monitor, whereas a red LED may indicate that one or more parameters monitored by the unit is outside or beyond an acceptable range (i.e., as compared to an alarm or alert limit).

The base module illustrated in FIG. 2 is also configured to receive a modular power supply. As noted above, several such power supplies may be envisaged. As illustrated in FIG. 2, for example, a battery power supply 46 may be provided on a rear face of the base module, or may be replaced by a power converter module 48 designed to be electrically coupled to a wire power supply from the monitored load, or even a photovoltaic power supply 53. It should be noted that the various power supplies illustrated in FIG. 2 are shown for exemplary purposes only, and other power supplies and configurations may, of course, be envisaged. In the illustrated embodiment, each of the power supplies is provided with contacts 90 that interface with mating contacts (not shown) on the base module for transmitting power to the base module. While not illustrated in FIG. 2, it is contemplated that such power supplies may mechanically interface and mate with the base module via sliding latches, conventional fasteners, and so forth.

As discussed in greater detail below, the base module 78 may itself incorporate integrated sensors, and thus operate as a stand-alone unit. However, where desired, multiple instruments or sensors may be tethered to the base module. In the embodiment illustrated in FIG. 2, two such devices, an accelerometer 56 and a tachometer 58 are provided. Each of these has an attached cable or tether 92 along with a multi-pin connector 94 designed to interface with the connectors 84 of the base module. In a presently contemplated embodiment, the base modules are provided with four input channels for multiple types of sensors. However, fewer or more such channels may be provided in the base module.

Figure 3:
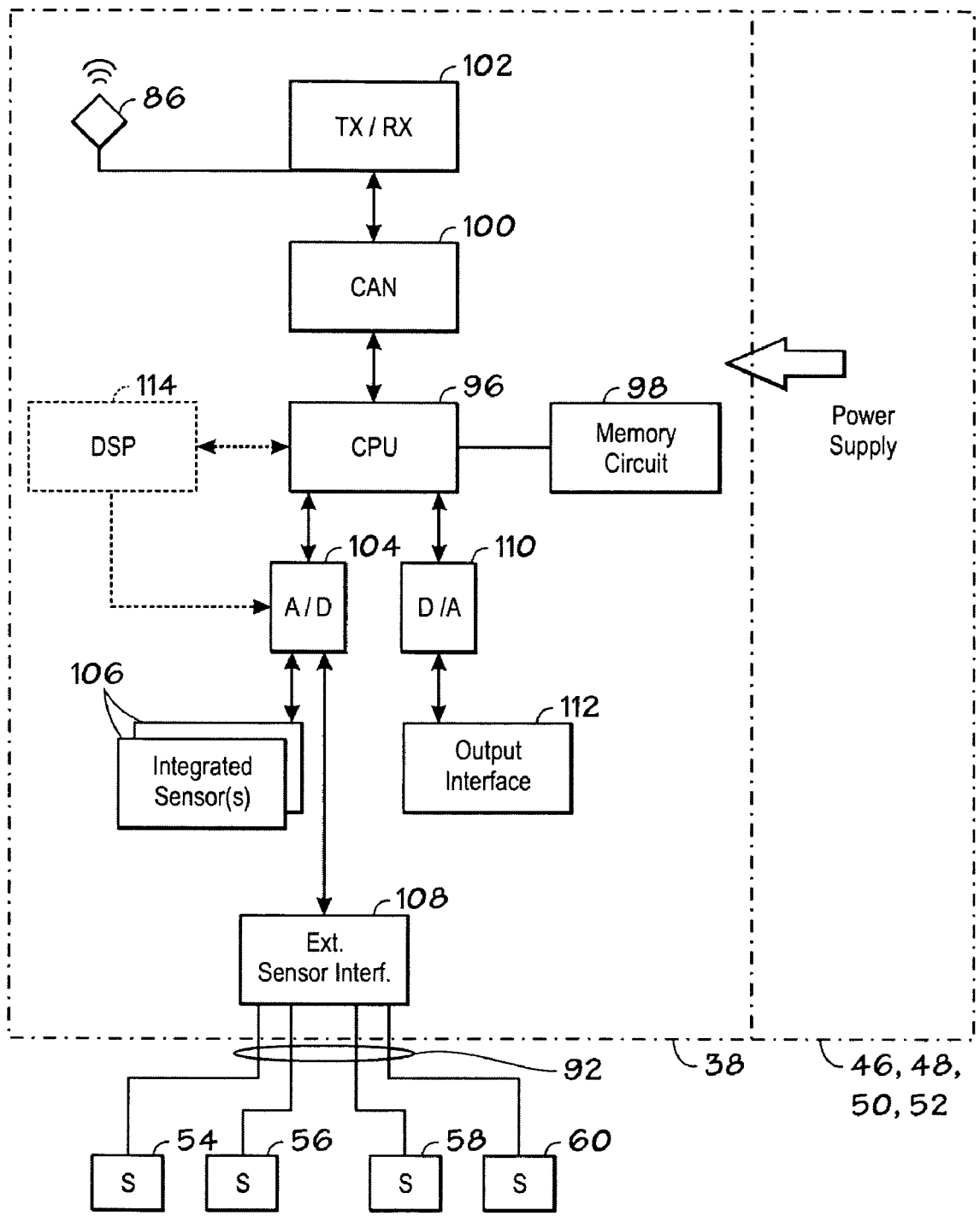
FIG. 3 is a diagrammatical representation of certain of the functional components within the modular monitoring arrangement of FIG. 2.

FIG. 3 is a diagrammatical illustration of certain of the functional components that may be included in the base module of a wireless monitor, such as monitor 38. The circuitry of the monitor illustrated in FIG. 3 is designed to provide processing capabilities for carrying out analysis of the collected signals. By way of example, the module includes a central processing unit 96, which may typically be based upon a microprocessor, programmable logic array, or other processing device. A memory circuit 98 is coupled to the CPU for storing program instructions, programmable data, computation routines, and so forth carried out by the CPU. Memory circuit 98 may also store the collected data from the sensors that is to be transmitted to other modules or to remote data collection equipment.

It should be noted that a wide variety of configuration parameters may be stored within each monitoring module. For example, sensor or transducer parameters may include the transducer type, its sensitivity, units of measure, low and high fault settings, DC bias time constants, and so forth. In vibration monitoring modules, parameter settings may include such settings as channel name (for each of the multiple channels provided), output data units, high pass filter settings, full scale settings, sampling mode settings (e.g. synchronous or asynchronous), and so forth. Overall measurement parameters may also be set, such as for RMS calculations, peak calculations, peak-to-peak calculations, overall time constant calculations, damping factor calculations, as well as a range of spectrum and time waveform parameters. The latter may include values such as maximum frequency, number of lines or bins in spectrum measurements, period of waveforms, number of samples in waveform measurements, and window type (e.g. Hanning, rectangular, Hamming, flat top, and Kaiser Bessel). Band measurement parameters may also be set, such as RSS and peak signal detection settings, minimum and maximum frequencies in bands, and so forth. Similarly, various settings may be provided for speed or tachometer settings, such as for averaging, pulses per revolution, trigger mode, and so forth.

A CAN chip or circuit 100 is coupled to the CPU 96 for encoding signals from the CPU for transmission, and for decoding data received for use by the CPU. The CAN circuit 100 is, in turn, coupled to a transmit and receive circuit 102 that drives the antenna 86 to transmit and receive the data in accordance with the network protocol discussed above.

The module may further include an analog-to-digital converter 104 that converts sensed analog signals to digital signals for use by the CPU. In the embodiment illustrated in FIG. 3, the module includes one or more integrated sensors 106, such as accelerometers, thermocouples, and so forth. An exterior sensor interface 108 may also be included which may serve such functions as filtering and multiplexing signals to and from a series of sensors illustrated externally in FIG. 3. As noted above, these sensors may typically be coupled to the module via tether cables 92. Similarly, the module may include a digital-to-analog converter 110, where appropriate. Such converters may be used to provide analog output signals to an output interface 112, which may be coupled to actuators, alarms, visual and audible output devices, and so forth.

The CPU 96 is generally capable of carrying out monitoring routines for receiving the single or multiple channels of input data from the sensors, and storing the input data. Enhanced functions may be carried out by the CPU, such as for establishing trends in the sensed data, making comparison between the sensed data and alarm or alert levels, as well as for carrying out more complex computations based upon the sensed data. Such calculations may include, for example, Fast Fourier Transforms to identify vibrations and amplitudes of vibrations at specific frequency bands in a manner generally known in the art. Where desired, additional computational circuitry, such as a digital signal processor 114 may also be included and coupled to the CPU 96. Such DSP circuits 114 may be dedicated for rapid computation of parameters of interest, such as vibration profiles, where desired. As noted above, the entire module is associated with a power supply which provides the power needed for any sensing, as well as for the execution of routines on the CPU, the calculation of parameters of interest, and for the transmission and reception of data.

Figure 4:
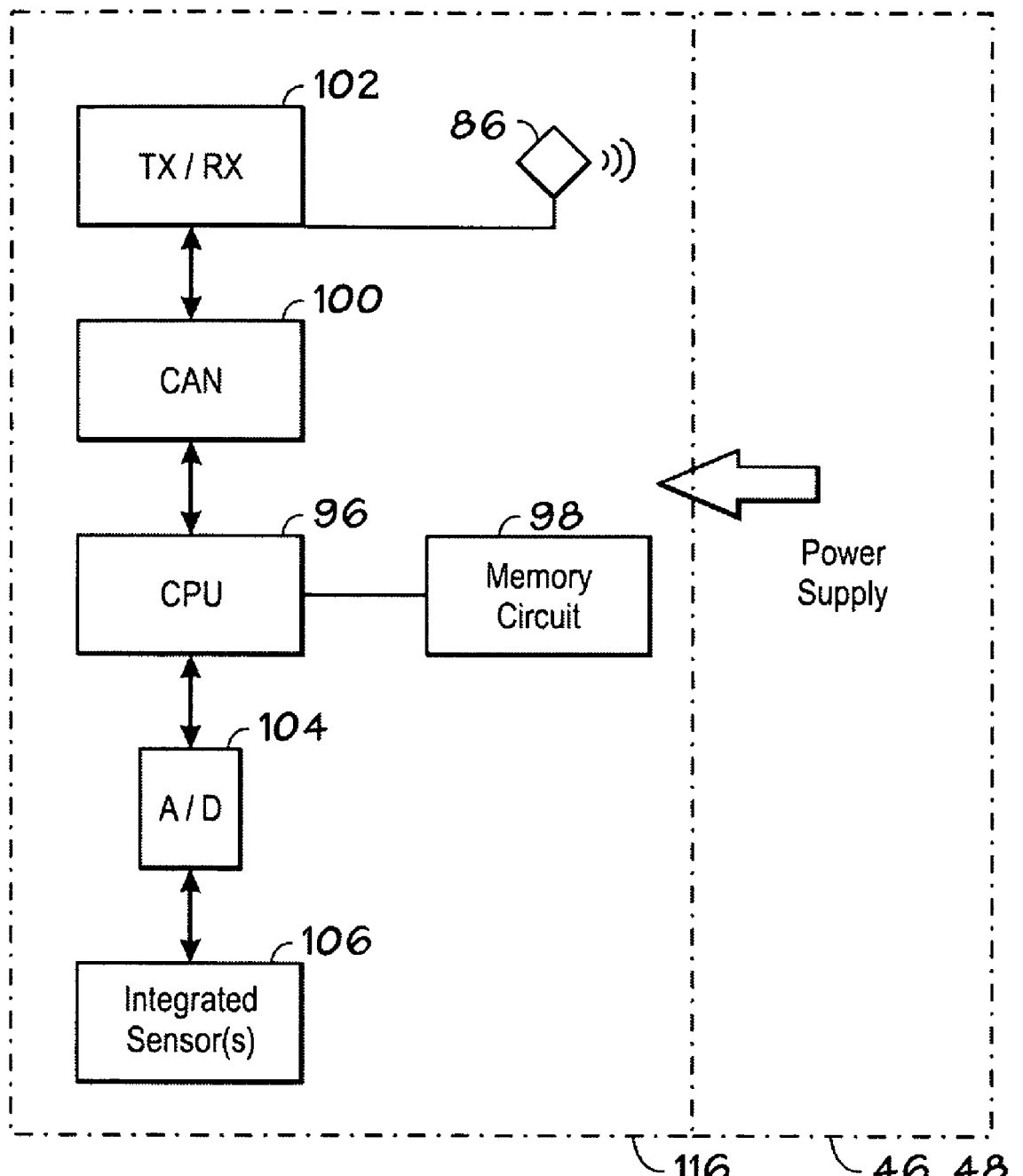
FIG. 4 is a similar diagrammatical representation of certain functional components within a simplified modular wireless monitor.

Various components of those illustrated in FIG. 3 may be excluded from the module, and other components may be added, where desired. The illustrated components are shown here for illustrative purposes only. By way of example, however, FIG. 4 illustrates a simplified module that is designed to function as a stand-alone wireless sensing and monitoring module. This module 116 includes a CPU 96 as discussed above, along with CAN circuitry and a transmit and receive circuit 102 for driving the antenna 86. A memory circuit 98 again stores any programming necessary for sensing and transmitting the signals by the module, as well as the sensed data itself. An analog-to-digital converter 104 is coupled to the CPU for converting sensed signals to digital values for use by the CPU. In this embodiment, however, any sensors are completely integrated as indicated at reference numeral 106. No separate tethered sensors are provided. The wireless monitoring module 116 of FIG. 4, then, forms an entirely stand-alone sensor that can communicate with other wireless modules, or with wired master modules. The modules thus equipped can also be arranged only to sense and/or transmit data when prompted to do so by a remote device, a wireless HMI, and the like.

As noted above, certain functionalities carried out within the wireless modules may be distributed among several such modules. For example, a module having functional components such as those shown in FIG. 3 may communicate with a simplified module of the type shown in FIG. 4. More complex calculations may be provided in the enhanced module of FIG. 3 based upon the data collected in the simplified module of FIG. 4. Such calculations may include calculations only referencing data from the simplified module, or calculations based upon data from both modules, even in conjunction with additional data from other modules.

Figure 5:
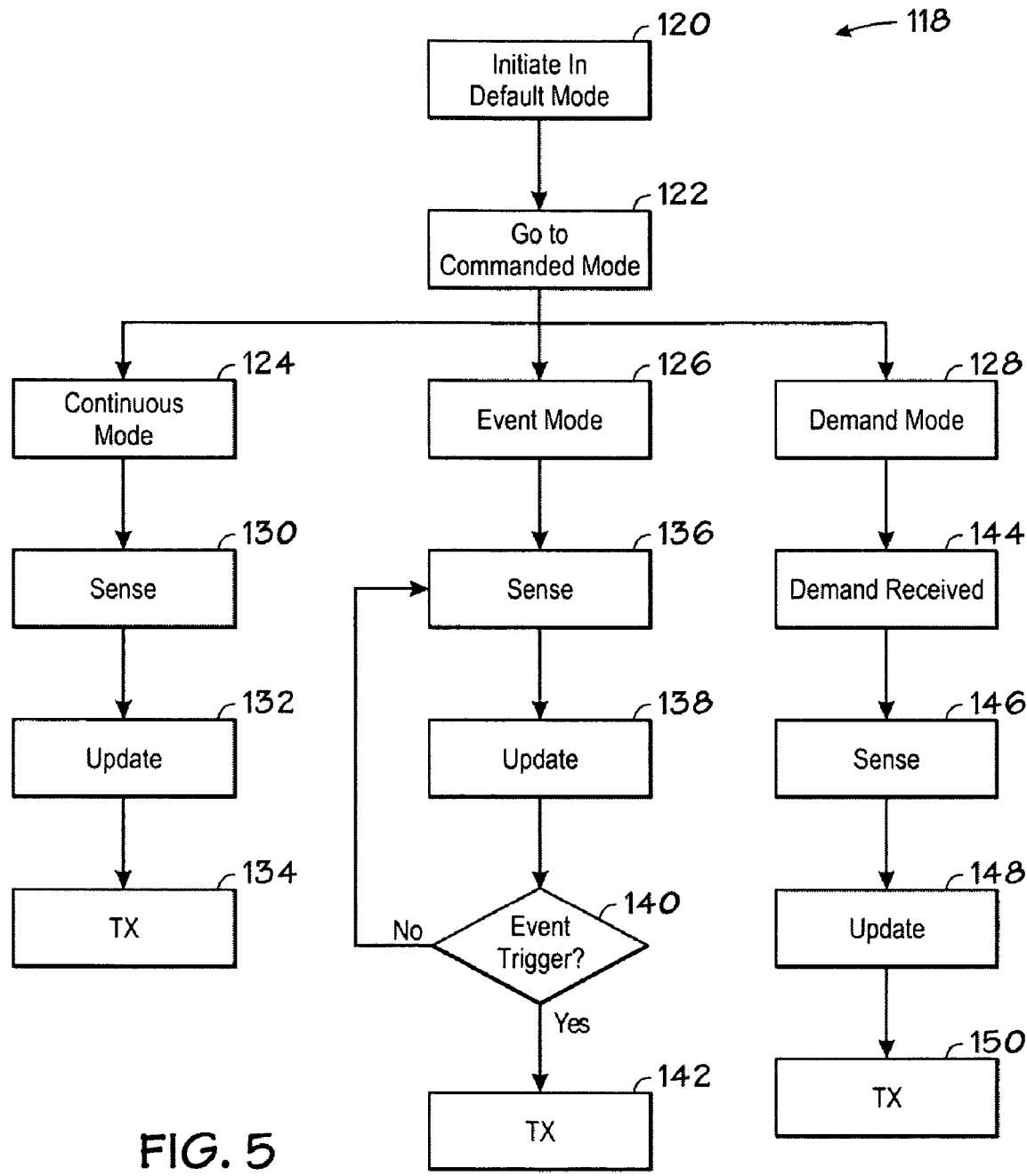
FIG. 5 is a flow chart illustrating exemplary logic in accordance with several alternative modes of operation that may be implemented in the modular monitoring system of the invention.

As noted above, where desired, data collected by the wireless modules may be collected on various bases, including continually, intermittently, or even on demand. Similarly, data may be transmitted in various schemes, all of which may be influenced by the power consumption of the wireless modules, their available power supplies, and the need for the data. FIG. 5 generally illustrates control logic for several different modes of operation presently envisaged.

The control logic, designated generally by reference numeral 118 in FIG. 5, may begin with initiation of operation in a default mode as indicated at reference numeral 120. As discussed below, such default modes may include a continuous mode, and event mode or a demand mode, among others. The mode of operation may initiated in the default mode to greatly facilitate installation and operation of the modules. For example, the default mode may be set as a demand mode in which the modules only sense and transmit data when requested. The default mode would generally also include some scheme for listening for command signals, such as schemes based upon windows of time in which the module awakens to determine whether any unicast or broadcast command intended for it has been received. From the initial default mode, one of the alternative available modes may then be commanded as indicated at reference numeral 122. Essentially, this step may alter the mode on which one or more of the modules operates from the default mode. The commanded mode may then change not only the manner in which data is collected, but the manner in which it is processed, the manner in which it is transmitted, the frequency (time windows) in which it is transmitted, the priority of transmission, and so forth.

Three alternative modes of operation are illustrated in FIG. 5 including a continuous mode 124, and event mode 126 and a demand mode 128. In the continuous mode 124, when the acting as the default or the commanded mode, may operate as follows. On a periodic or continuous basis, parameters are sensed by the one or more sensors associated with the particular wireless monitor module as indicated at step 130. Based upon such sensed data, the memory circuitry of the monitoring modules update as indicated at step 132. Based, then, upon the configuration of the module for transmission (e.g., a type of transmission, protocol for transmission, priority of transmission, time windows for transmission, and so forth), the data is transmitted as indicated at step 134. As will be appreciated by those skilled in the art, the transmission typically will include identification of the particular wireless module, such as by reference to a network address, as well as a bit stream encoding the sensed or processed data. Though not represented in FIG. 5, the updating step 132 may, of course, include any such processing for which the individual monitoring module is programmed.

In the event mode 126, the module may again sense data on a continuous or periodic basis, as indicated by step 136. The memory circuitry is then updated as indicated by reference numeral 138 with the new sensed data, or with data derived from the sensed data, such as through any pre-programmed processing steps. At step 140, then, the module determines whether any particular event may trigger transmission of the data. Such events may include, for example, certain parameters exceeding or falling outside the bounds of acceptable ranges as determined by alarm or alert levels. As will be appreciated by those skilled in the art, such levels may refer to actual parameters, such as temperatures, fluid levels, pressures, and so forth, or data derived from actual measured parameters, such as vibration levels at particular frequencies, and so forth. If no event has triggered the transmission of the data, the processor would simply recycle and remain in the sensing loop until such an event is determined to trigger transmission. Ultimately, then, once any such event is identified, transmission is triggered as indicated by reference numeral 142 in accordance with the configuration of the particular module for such transmission.

Alarm and alert levels may have several interesting and particularly useful characteristics. Firstly, different alarm levels may be set for different frequency bands, the limits of which may also be set, so as to allow for the specific tailoring of the monitoring and protection functions to individual systems based upon their typical or desired frequency response. Moreover, multiple alarm levels may be set by an operator for each frequency band and for the multiple frequency bands. Accordingly, the alarm levels may be configured so to define ranges such as minimum and maximum vibration levels.

A number of alarms and alerts may be configured in a present implementation of a vibration monitor incorporating aspects of the present technique. The number and a name designation of each alarm may be set, along with parameters for enabling or disabling of each alarm. Conditions for response to the alarm settings may include "greater than," "less than," "inside range," "outside range," and various threshold settings for certain of these. Hysteresis settings may also be provided to prevent false alarms or to prevent clearing of an alarm. Similarly, threshold multipliers and startup periods may be set to prevent false alarms during periods of startup or transition of machinery through certain resonant frequencies.

In the demand mode 128, the module may essentially remain asleep or dormant, with the exception that it will periodically awaken to determine whether any demand has been sent by unicast or broadcast for data. When such a demand is received, as indicated at step 144, the module senses the desired parameter as indicated by step 146. At step 148 any necessary processing is performed on the sensed data and the memory circuitry is updated with the new sensed or processed data. Finally, at step 150 the data is transmitted in response to the demand as described above with reference to steps 134 and 142.

In general, many such schemes may be implemented to provide data on an as-needed basis, but also in view of the power consumption of the individual module. In general, it may be anticipated that the continuous mode, for example, requires relatively more power than the event mode, with the demand mode requiring the least amount of power. It should also be noted that the hybrid modes may be developed, such as to permit remote requests for data that interrupt the event mode and provide the data for integration with other system data as needed. Such requests may be made by a human operator, such as from a remote location as described above, or via a wireless HMI mentioned above or by other modules, including other wireless monitoring modules.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A modular wireless monitoring system comprising:
   a base module configured to process, store and wirelessly transmit data based upon sensed signals;
   a stand-alone sensor module separate from but removably tethered to the base module for sensing a dynamic operating parameter of a machine system and for applying the sensed signals to the base module via the tether; and
   a power module coupled to the base module for providing power for operation of the base module and the sensor module.

2. The modular wireless monitoring system of claim 1, wherein the base module is configured to receive multiple tethered sensor modules and to process, store and wirelessly transmit data based upon signals sensed from the multiple tethered sensor modules.

3. The modular wireless monitoring system of claim 1, wherein the sensor module includes an accelerometer for generating vibration signals representative of vibration of the machine system, and wherein the base module is configured to generate a vibration profile based upon the vibration signals.

4. The modular wireless monitoring system of claim 1, wherein the base module is configured to compare data derived from the sensed signals to at least one alarm or alert level, and to wirelessly transmit an alarm or alert transmission based upon the comparison.

5. The modular wireless monitoring system of claim 1, wherein the system is configured to monitor sensed signals on a periodic basis and to transmit data derived from the sensed signals periodically.

6. The modular wireless monitoring system of claim 1, wherein the system is configured to monitor and sensed signals and to transmit data based upon the sensed signals upon receipt of a demand from a remote device.

7. The modular wireless monitoring system of claim 1, wherein the system is configurable between a plurality of sensing, processing and data transmission modes.

8. The modular wireless monitoring system of claim 1, wherein the power module is selected from one of a plurality of interchangeable power modules including a wired converter module, a battery module, and a power scavenging module.

9. The modular wireless monitoring system of claim 1, wherein the system is configured to receive wireless data transmissions from at least one other wireless monitoring system and to process the received data in combination with data derived from signals from the tethered sensor module.

10. The modular wireless monitoring system of claim 1, wherein the system is configured to transmit data in accordance with an open industrial data exchange protocol.

11. A modular wireless monitoring system comprising:
a plurality of modular wireless monitors each including a base module configured to process, store and wirelessly transmit data based upon sensed signals, a stand-alone sensor module separate from but removably tethered to the base module for sensing a dynamic operating parameter of a machine system and for applying the sensed signals to the base module via the tether; and a power module coupled to the base module for providing power for operation of the base module and the sensor module, the monitors being disposed adjacent to monitoring points of the machine system.

12. The modular wireless monitoring system of claim 11, further comprising at least one host monitor wired to a data network and configured for wireless communication with the wireless monitors, the host monitor receiving data from the wireless monitors and sending data on the data network based upon the received data.

13. The modular wireless monitoring system of claim 12, wherein the host monitor performs calculations based upon the received data that the wireless monitors are incapable of performing.

14. The modular wireless monitoring system of claim 11, wherein the wireless monitors are configured to transmit data in a synchronized fashion to one another.

15. The modular wireless monitoring system of claim 11, wherein at least one wireless monitor receives data from at least one other wireless monitor and performs calculations based upon the received data that the originating wireless monitor is incapable of performing.

16. The modular wireless monitoring system of claim 11, further comprising a wireless human machine interface configured to be transported between the monitoring points and to collect data from the wireless monitors via wireless data transmission.

17. The modular wireless monitoring system of claim 11, wherein at least one of the wireless monitors senses vibration data and computes vibration amplitudes via a Fast Fourier Transform.

18. A modular wireless monitoring system comprising:
a plurality of modular wireless monitors each including a base module configured to process, store and wirelessly transmit data based upon sensed signals, a stand-alone sensor module separate from but removably tethered to the base module for sensing a dynamic operating parameter of a machine system and for applying the sensed signals to the base module via the tether; and a power module coupled to the base module for providing power for operation of the base module and the sensor module, the monitors being disposed adjacent to monitoring points of the machine system; and
at least one host monitor wired to a data network and configured for wireless communication with the wireless monitors, the host monitor receiving data from the wireless monitors and sending data on the data network based upon the received data.

19. The modular wireless monitoring system of claim 18, wherein the host monitor performs calculations based upon the received data that the wireless monitors are incapable of performing.

20. The modular wireless monitoring system of claim 18, wherein the wireless monitors are configured to transmit data in a synchronized fashion to one another.

21. The modular wireless monitoring system of claim 18, wherein at least one wireless monitor receives data from at least one other wireless monitor and performs calculations based upon the received data that the originating wireless monitor is incapable of performing.

22. The modular wireless monitoring system of claim 18, further comprising a wireless human machine interface configured to be transported between the monitoring points and to collect data from the wireless monitors via wireless data transmission.

* * * * *